United States Patent Office 3,148,151
Patented Sept. 8, 1964

3,148,151
METHOD OF PREPARING RARE EARTH-ACTINIDE METAL OXIDE SOLS
Frederick T. Fitch and Jean G. Smith, Baltimore, Md., assignors to W. R. Grace & Co., a corporation of Connecticut
No Drawing. Filed Feb. 27, 1962, Ser. No. 176,153
5 Claims. (Cl. 252—301.1)

This invention relates to stable sols of particles composed of actinide and rear earth oxides as an intimate mixture or as solid solution oxide phases and the method of preparing these sols. In one particular embodiment, this invention relates to the method of preparing stable yttria-urania sols and to sols as compositions-of-matter.

In the preparation of high-temperature ceramic nuclear elements, a sol with particles composed of a binary rare earth-actinide oxide mixture offers advantages as a fuel source due to the fine particulate actinide oxide dispersion. Other improvements result from the physical properties of the ceramic material prepared using colloidal materials. The rare earth-actinide oxide compositions may be used to stabilize certain of the actinide oxide fuels. The sols of our invention are incorporated in the fuel elements by adding the sols to the other components to form a paste which is subsequently fired. Alternately the sols may be reduced to powder form and added to the other components using standard techniques common in the ceramic industry. These powders can be prepared from the sols by vacuum evaporation or by any of the other conventional techniques.

One of the problems encountered in the preparation of fuel elements is the instability of the actinide oxides. Uranium dioxide, for example, when heated in air will transform to $U_3O_8$. The compound $UO_2$, as it is conventionally prepared, has the fluorite crystal structure. When the $UO_2$ adsorbs oxygen, the fluorite structure is stable until the composition reaches approximately $UO_{2.3}$. (This fluorite structure is reportedly also stable down to the composition of $UO_{1.75}$.) Above $UO_{2.3}$, the fluorite structure breaks down. The volume expansion of the $UO_2$ transforming to $U_3O_8$ may disrupt the fuel elements and permit escape of fission products. In addition to these problems, the $U_3O_8$ has an appreciable vapor pressure at temperatures in excess of 1200° C., which causes loss of part of the fuel from the system due to vaporization. The need for stable high temperature nuclear fuel requires the prevention of the $UO_2$—$U_3O_8$ transformation.

One of the principal uses of the material prepared by the process of our invention is the preparation of reactor fuel elements which resist oxidation with its undesirable consequences. This is accomplished by forming the rare earth metal oxides having a low capture cross section in conjunction with actinide metal oxides to stabilize the fluorite structure. This is possible because in the system of rare earth oxides with actinide oxides such as urania and plutonia the crystal habit and unit cell dimensions favor solid solutions. The rear earth oxide has a stabilizing effect by inhibiting destruction of the fluorite structure by conversion of the $UO_2$ to $U_3O_8$, for example. The process and product of our invention have the added utility of preventing the loss of fuel from nuclear reactors due to volatility associated with oxidized urania. If $UO_2$ is stabilized using the process and products described below, there is no problem with loss because there is no transformation of uranium dioxide to the volatile $U_3O_8$. These problems are not of prime importance in ceramic elements where thoria is the principal component since these crystal changes do not occur. For that reason we do not include thoria as one of the components in the product and one of the reactants in the process of our invention.

We have found that stable sols of dense, spherical particles composed of two oxides, where one of the oxides is an actinide metal oxide and the other oxide is a rare earth oxide, can be prepared by several alternate processes. One process comprises autoclaving the active previously-formed sols of the rare earth oxide and actinide metal oxides at temperatures above 100° C. for a period of time sufficient to insure interaction of the sols. Residual electrolyte can be reduced to a very low level by centrifuging, decanting, and redispersing the sol particles in deionized water or by deionizing through a mixed anion-cation exchange resin bed. The sols prepared by this process are also disclosed as new compositions-of-matter.

An alternate process comprises preparation of solutions of salts of the metals, mixing the solutions and adding the mixture to excess ammonia solution to precipitate the hydroxides. The hydroxides are then peptized, the mixture heated and the sol product autoclaved to improve sol particle characteristics.

As stated previously, one of the components of our sols are the rare earth. The elements to be included in the rare earth group are not too well agreed upon. The most widely accepted use of the term included the elements lanthanum through lutetium. We, however, preferred to include yttrium because of its similarities to other members of the group. In the term "rare earths" we include the elements yttrium, lanthanum, cerium, praseodymium, neodymium, promethium, samarium, europium, gadolinium, terbium, dysprosium, holmium, erbium, thulium, ytterbium, and lutetium. The actinide metals are better defined. We do not intend to include all of the actinide metals in our definition. Our term "actinide metals" includes uranium, plutonium, and the elements above plutonium, such as americium, curium, etc. We do not include the elements below uranium in our classification of the actinide metals.

We have discovered a method of preparing hydrous oxides of rare earths and actinide metals in the form of true aquasols which are stable in concentrations up to 30% solids at temperatures up to 300° C. These new aquasols are novel and have very useful properties. The principal use contemplated by these sols is the preparation of ceramic fuel elements as stated above. For purposes of simplicity, our process will be described by using the system yttria-urania. However, we intend to include the other materials as stated previously.

Broadly stated, the process of our invention comprises the preparation of sols of the rare earths and the subsequent preparation of our sol product by mixing these sols under carefully controlled conditions with sols of the actinide metal oxides.

The method of preparing the rare earth sols is not considered part of our invention. A suitable process for their preparation is briefly as follows:

A solution of the metals is prepared either with individual members of the group such as yttrium, for example, or mixtures such as the mixture known as didymium. (Didymium is the name given to a cerium-free mixture of the lighter rare earths. Didymium oxide usually contains from about 40 to 50% lanthanum oxide, from 35 to 40% neodymium oxide, from 8 to 15% praseodymium oxide, 3 to 8% samarium oxide, the balance being various other rare earths.) The solution of the rare earth salts is then treated with ammonia to precipitate the corresponding hydrous rare earth oxide. The major portion of the ammonium salt is removed by standard techniques such as decanting and washing, filtering and washing, dialysis, ion exchange, etc. During this process the pH of the solution is maintained in the range of about 9.5 to 10.5 by maintaining a free ammonia content. The hydrous oxide is then washed free of ammonia and peptized by adjusting pH to about 7 with acetic acid, heating at a temperature of about 60 to 100° C. for a period of about 5 to 60 minutes with stirring. The aquasol product at this point is an active sol such as the sols we use in the preparation of our rare earth actinide metal oxide sols.

The preparation of the actinide metal oxide sols is likewise not considered part of this invention. These sols can be prepared by removing anions from a uranous chloride solution by ion exchange or by electrodialysis under conditions which do not promote particle growth. Active sols obtained by such methods generally consist of particles less than 10 millimicrons in size.

After the two sols have been prepared, they are mixed in the active state. This is an important limitation on our process since any rare earth or actinide metal sol rendered sufficiently inactive by heating will not take part in the reactions. The two sols are then mixed to provide the final desired composition. Suitable sols include those having a rare earth content in the range of 0.5 to 90 mole percent and an actinide metal content in the range of 10 to 99.5 mole percent. Preferred sols include those having a rare earth content of .40 to 80 mole percent and an actinide content of 20 to 60 mole percent. Our especially preferred sol consists of a yttria-urania sol containing 40 to 80 mole percent yttria and 20 to 60 mole percent urania.

The sols are then heated at a temperature of 100 to 300° C., for a period of about 1 to 40 hours, preferably at 120 to 180° C. for 15 to 25 hours. The reaction is preferably carried out in the presence of a nitrogen atmosphere. The use of nitrogen, or some other inert gas, as an atmosphere over the reactants, eliminates obvious difficulties which might be encountered if the actinide metals were to oxidize during the reaction. The sol is then deionized and concentrated by centrifuging, decanting and redispersing in deionized water. In the coprecipitation technique, solutions of soluble salts of the actinide metals and the rare earths are prepared to have a rare earth content in the range of 0 to 90 mole percent and an actinide metal content of 10 to 100 mole percent. The solutions are mixed and added slowly to an excess of aqueous ammonia. The resulting precipitate is then washed under nitrogen until free of electrolyte.

The next step in the process is the peptization of the product. The peptization is carried out by the addition of small quantities of acid. Any non-oxidizing, monohydrogen acid may be used. The preferred acid is acetic acid. The amount of acid used to peptize the mixed oxides depends upon the amount of electrolyte still present at the point of peptization. The best criterion for deciding the amount of acid to be used is based upon pH. A suitable result is obtained when the pH of the material is reduced by the addition of acid to about pH 7.0 The peptization is generally carried out at an elevated temperature of about 40 to 100° C. for at least one hour. After peptization, the product is autoclaved to complete formation of the composite sol. The autoclaving is carried out by heating the components at a temperature of 100 to 200° C. for a period of 2 to 30 hours preferably at a temperature of 120° C. for about 15 hours.

The invention is further illustrated by the following specific but non-limiting examples.

*Example I*

A mixture containing the equivalent of 1 g. of total oxide/100 ml. of solution, having a composition of 74 mole percent $YO_{1.5}$ and 26 mole percent $UO_2$ was prepared. The mixture was obtained by adding 69.6 ml. of a reactive $UO_2$ sol having a particle size of 3 to 7 millimicrons and containing 3.9 g. of $UO_2/100$ ml. solution to 66.6 ml. of reactive $Y_2O_3$ sol containing 5 g. of $Y_2O_3/100$ ml. of solution. The urania sol was prepared by electrodialysis of uranyl chloride solution. The $Y_2O_3$ sol was prepared by peptizing thoroughly washed $Y(OH)_3$ with acetic acid at 60° C. The mixed sol was diluted to 600 ml., and heater at 150° C. for 23 hours in a stirred autoclave. At the end of this time the autoclave was cooled and the product removed. A bright blue product sol was obtained having a pH of 6.7 and a specific conductance of $2.4 \times 10^{-3}$ mhos/cm. The sol was deionized and concentrated by centrifuging, decanting, and redispersing in a minimum of deionized water.

The sol was submitted for analysis by electron microscopy. The particles were shown to be spherical aggregates averaging 65 millimicrons in diameter and composed of 7 millimicron sub-particles. The X-ray diffraction pattern was obtained. This X-ray pattern showed lines for $UO_2$ only. The fact that no $Y_2O_3$ lines could be detected by X-ray and that the electron micrograph showed the sol particles to be homogeneous in composition is conclusive proof that the yttria was amorphous yet intimately associated with urania within each particle.

*Example II*

A sol was prepared using a co-precipitation technique. In this run uranous and yttrium hydroxide were co-precipitated by adding 441 ml. of mixed chlorides containing the equivalent of 16.9 g. of $UO_2$ and 20.6 g. of $Y_2O_3$ to a 100% excess of concentrated ammonia diluted to a total volume of 308.6 ml. The oxide content of the initial solution was 75 mole percent $YO_{1.5}$ and 25 mole percent $UO_2$. The resulting gray black gelatinous precipitate was filtered by suction through fritted glass, then washed until relatively free of electrolytes. The washed precipitate was transferred to a flask and stirred with deionized water to a total volume of 750 ml., and peptized by adjusting the pH to 7.1 by adding 2.5 molar hydrochloric acid, followed by heating at 60° C. for 2 hours. The foregoing operations were carried out in a nitrogen atmosphere to inhibit oxidation. The peptized sol product was dark gray in color. Its pH was 7.0, its specific conductance $40 \times 10^{-3}$ mhos/cm. Electron micrographs of this sol show they consisted primarily of homogeneous fine-sized particles 3–7 millimicrons in size.

*Example III*

The effect of autoclaving the sol prepared in Example II was investigated. In this run part of the sol product of Example II was diluted to a total oxide concentration of 1 g./100 ml. and autoclaved for 24 hours at 150° C. with stirring under a blanket of nitrogen. On autoclaving, the original gray sol was transformed to a bright green sol. Examination of the product at the end of the run showed that the particle density of the sol was slightly improved. However, there was no appreciable change in particle size except that the few larger incompletely peptized particles, which were present in the original sol, were converted to a fine-sized material. The X-ray diffraction pattern of this product revealed a single phase system of the fluorite type. X-ray data indicated a solid solution formation by virtue of a shift in cell constant from 5.42 A. for pure urania sol to 5.36 A. for the mixed oxide sol. On the basis of these figures, the sol consisted of a solid solution phase which was about 40 mole percent $YO_{1.5}$ and 60 mole percent $UO_2$. The remainder of the yttria was amorphous, but intimately associated with other phases in the particles. Properties of the autoclaved sample before and after hydrothermal treatment are as follows:

Before autoclaving _____ pH 7.02.
Specific conductance _____ $2.4 \times 10^{-4}$ mhos/cm.
After autoclaving _____ pH 6.89.
Specific conductance _____ $4.1 \times 10^{-4}$ mhos/cm.

*Example IV*

Another mixed urania-yttria sol was prepared by mixing 108.2 ml. of uranous chloride containing the equivalent of 5 g. $UO_2$/100 ml. with 41.2 ml. of yttrium chloride solution containing the equivalent of 16 g. $Y_2O_3$/100 ml. The material was then added to a 100% excess of ammonia with vigorous stirring. The operations were carried out under a nitrogen atmosphere to prevent oxidation. The coprecipitate was filtered by suction through fritted glass and washed with about 1 liter of deionized water. The washed precipitate was then stirred with water to a total volume of 300 ml. The pH was adjusted to 7 with 12 ml. of 2.5 molar hydrochloric acid. This slurry was peptized by heating for 2 hours at 60° C. As in the previous steps all operations were performed under nitrogen. The resulting sol contained about 76 mole percent $YO_{1.5}$. It was black in color and contained 4 g. total oxide/100 ml. The pH was 6.82 and specific conductance $1.4 \times 10^{-2}$ mhos/cm.

*Example V*

The stability of the above sol was improved by heating for 15 hours at 150° C. in a stainless steel stirred autoclave. The total oxide concentration was reduced before autoclaving to about 1 g./100 ml. through dilution with deionized water. The small amount of sludge that was present was removed from the product by filtration through glass wool.

The pH of the final solution was 6.60 and the specific conductance $4.3 \times 10^{-3}$ mhos/cm. The sol was submitted for electron microscopy studies. The electron micrograph showed the dispersed phase to consist of open-centered cubes 7 millimicrons in diameter formed through densification of peptized gel. A sample of dispersed solids was separated from the liquid medium for X-ray diffraction study by centrifuging at 15,000 r.p.m. The X-ray studies showed the product to consist of a single crystalline phase which was face-centered cubic and had a lattice constant of 5.384. After corrections were made for the effect of oxygen on the lattice constant, the latter was estimated as representing about 49 mole percent $YO_{1.5}$. The difference between this figure and the 76 mole percent $YO_{1.5}$ in the starting system was obviously amorphous yttria which was intimately and homogeneously distributed throughout the particles. No inhomogenities in the composition were detected by electron microscopy.

It is apparent from a review of the data presented above that a suitable sol of ytteria and urania can be prepared using the techniques described in the examples.

Obviously many modifications and variations of the invention can be made without departing from the essence and scope thereof. Only such limitations should be applied as are indicated in the appended claims.

What is claimed is:

1. A process for preparing rare earth-actinide metal oxide sols, wherein said actinide oxide is selected from the group consisting of uranium, plutonium, americium and curium oxides which comprises autoclaving active previously-forming sols of rare earth oxides, said sols having a rare earth content of 0.5 to 90 mole percent and an actinide metal content of 10 to 99.5 mole percent and actinide metal oxides, at a temperature above 100° C. for a period of about 1 to 40 hrs., deionizing to remove electrolytes and recovering the product sol.

2. A process for preparing yttria-urania sols comprising particles of about 10 to 100 millimicrons in diameter, said sols being stable at concentrations up to 30% solids, which comprises preparing an active sol of urania by electrodialysis and an active sol of yttria by peptizing the hydroxide, autoclaving said sols at a temperature of about 100–300° C. for about 1 to 40 hours, deionizing to remove electrolytes and recovering the product sol.

3. A process for preparing stable yttria-urania sols comprising about 0.5–90 mole percent yttria, and 10–99.5 mole percent urania, and consisting of a dispersion of particles of about 10 to 100 millimicrons in diameter, which comprises mixing an active uranous sol, prepared by electrodialysis of the solution of the chloride, and an active yttria sol, prepared by peptization of the freshly prepared hydroxide with acetic acid in the proportions necessary to give a product containing the desired amount of each component, autoclaving the mixture, at a temperature of about 120–150° C. for about 5 to 25 hours, centrifuging, separating the particles, redispersing the particles in deionized water and recovering the product sol.

4. A process for preparing stable yttria-urania sols of particles about 3 to 10 millimicrons in size which comprises preparing solutions of uranium chloride and yttrium chloride, mixing said solutions in the proportions necessary to give a product containing the desired amount of each component, slowly adding the mixed chloride solution to an excess of a basic precipitant, separating the precipitated hydroxides, washing free of electrolytes, adding a sufficient quantity of dilute acid to increase the pH of the mixture to about 7 followed by autoclaving the peptized product at a temperature of about 100–200° C. for a period of time sufficient to improve the particle acteristics and recovering the product sol.

5. A process for preparing a stable urania-yttria sol of particles of about 3 to 10 millimicrons in size which comprises preparing separate solutions of uranium chloride and yttrium chloride, mixing the solutions in proportions necessary to give about 25 mole percent yttria and about 75 mole percent urania in the final product, slowly adding the mixed chloride solutions to an excess of ammonia, filtering, peptizing the hydroxide by adding dilute hydrochloric acid to increase the pH of the mixture to about 7.0 followed by heating to about 40–100° C., for at least one hour, autoclaving the product for about 15 hours at a temperature of about 120° C., cooling, and recovering the product sol.

References Cited in the file of this patent

UNITED STATES PATENTS

| | | |
|---|---|---|
| 2,885,366 | Iler | May 5, 1959 |
| 2,905,528 | Johnson et al. | Sept. 22, 1959 |
| 2,920,024 | Barton | Jan. 5, 1960 |
| 2,984,628 | Alexander et al. | May 16, 1961 |
| 3,002,808 | La Mont | Oct. 3, 1961 |
| 3,024,199 | Pasfield | Mar. 6, 1962 |

FOREIGN PATENTS

| | | |
|---|---|---|
| 591,014 | Canada | Jan. 19, 1960 |

OTHER REFERENCES

Weiser: "Inorganic Colloid Chemistry," vol. II, pp. 276–286, 271–275, 321, 322 (1935).

AEC Document, K–295, Part 2, page 115, March 1, 1955.

Reactor Core Materials, vol. 1, No. 2, pp. 14, 15, and 19, May 1958; vol. 2, No. 3, pages 14, 15, and 20, August 1959; vol. 4, No. 3, page 11, 12, August 1961.

AEC Document, TID–11494, pages 1–16, Final Report for January 1956 to June 1958.

AEC Document, Y–1299, page 13, May 2, 1960.

UNITED STATES PATENT OFFICE
CERTIFICATE OF CORRECTION

Patent No. 3,148,151 September 8, 1964

Frederick T. Fitch et al.

It is hereby certified that error appears in the above numbered patent requiring correction and that the said Letters Patent should read as corrected below.

Column 1, lines 11 and 58, for "rear", each occurrence, read -- rare --; column 2, line 43, for "by these sols is" read -- for these sols is in --; column 4, line 3, for "heater" read -- heated --.

Signed and sealed this 19th day of January 1965.

(SEAL)
Attest:

ERNEST W. SWIDER
Attesting Officer

EDWARD J. BRENNER
Commissioner of Patents